United States Patent

[11] 3,590,566

| [72] | Inventors | Ernest M. Cutts, Sr.;<br>Ernest M. Cutts, Jr., both of R.D. #3,<br>Vincentown, N.J. |
|---|---|---|
| [21] | Appl. No. | 879,233 |
| [22] | Filed | Nov. 24, 1969 |
| [45] | Patented | July 6, 1971 |

[54] BERRY HARVESTER
10 Claims, 4 Drawing Figs.

[52] U.S. Cl. .................................................. 56/330
[51] Int. Cl. ............................................. A01g 19/00
[50] Field of Search .......................................... 56/330, 328, 30

[56] References Cited
UNITED STATES PATENTS

| 2,660,021 | 11/1953 | McDowell | 56/330 |
| 2,694,892 | 11/1954 | Nisbet | 56/30 |
| 3,165,879 | 1/1965 | Chapin | 56/330 |
| 3,255,578 | 6/1966 | Pertics | 56/330 |
| 3,413,789 | 11/1968 | Studer | 56/330 |

*Primary Examiner*—Russell R. Kinsey
*Attorney*—Morton C. Jacobs

ABSTRACT: A machine for harvesting berries from bushes arranged in a row has a wheel supported frame structure with side portions spaced transversely of each other a distance sufficient to enable the side portions to straddle the row. One side portion carries a bush engageable shaker assembly that includes rotatable and laterally oscillatable fingers for engaging successive bushes as the harvester moves along a row of bushes. Behind this assembly is a backboard from which an inclined chute leads down to a conveyor. The rotating and oscillating shaker assembly shakes berries loose from their branches. Opposite the shaker assembly on the second side portion is a blower which blows against the bushes and blows loosened berries over to the backboard from which they fall down onto the chute which then guides them to the conveyor that carries them toward a collecting station.

INVENTORS
Ernest M. Cutts, Sr.
Ernest M. Cutts, Jr.

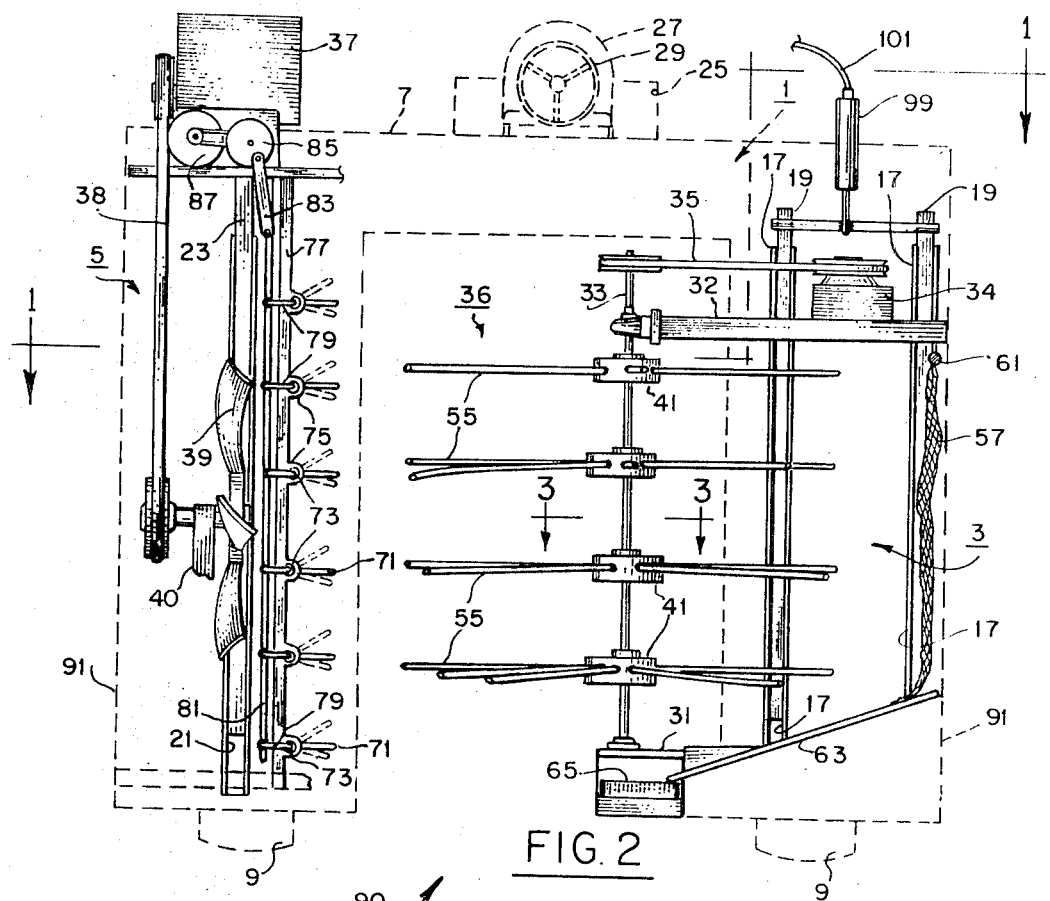
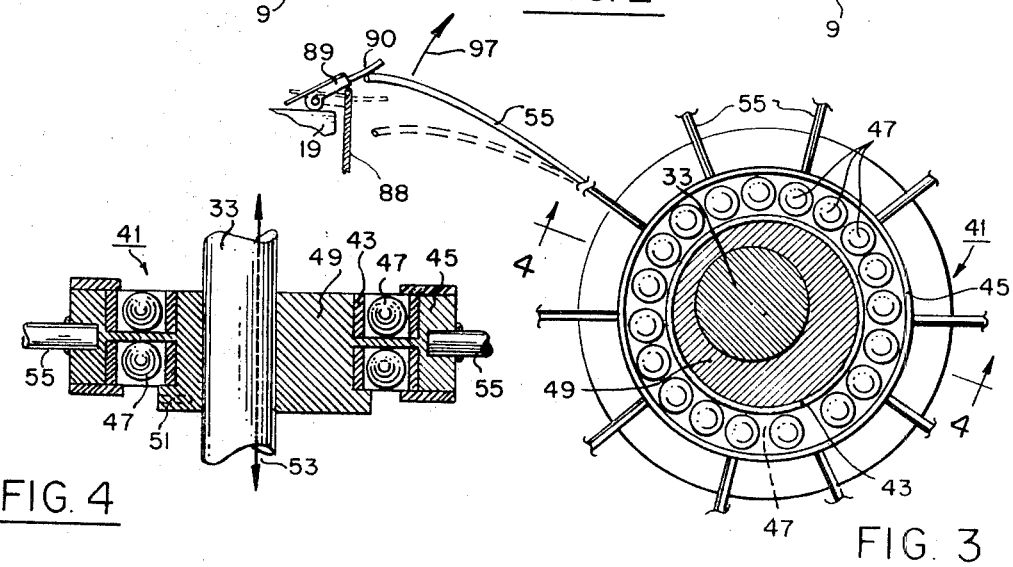

BERRY HARVESTER

BACKGROUND OF THE INVENTION

This invention relates to berry harvesting machines, and particularly to one adapted to loosen berries, such as blueberries, from their bushes and to collect them.

A number of machines of this type have been proposed heretofore, but such prior art machines have been found to have one or more defects that make them commercially impractical. For example, some such machines are so constructed that they often cause damage to the bushes, while some fail to do a complete enough harvesting job. Still other machines are so rough in operation that, even if they do not cause damage to the bushes themselves, they often bruise berries, such as blueberries, which are so relatively frail as to be easily subject to damage, especially when handled more or less roughly. There are also machines of the type mentioned which are inefficient in that they cause too many berries to fall to the ground and to be lost. Other shortcomings of many prior art berry harvesters, such as complicated structures, high cost, etc., are also known to berry growers

SUMMARY OF THE INVENTION

The primary object of this invention is to provide an improved berry harvesting machine.

More specifically, it is an object of the present invention to provide an improved berry harvester which will pick ripe berries at a high rate and with reasonable cost.

A further object of this invention is to provide an improved berry harvesting machine that will tend to minimize berry loss, and thus provide maximum yield.

Still a further object of this invention is to provide an improved berry picker which will handle relatively frail berries gently so as not to bruise them.

Another object of this invention is to provide an improved berry harvesting machine which can be accommodated to bushes of various sizes.

Still another object of this invention is to provide an improved berry harvesting machine which can be operated easily.

It is also an object of this invention to provide an improved berry picker as aforesaid which is relatively simple, yet very durable, in construction; which can travel over a row of berry bushes in straddling relation therewith; which can be steered easily along such a row; which is practical to manufacture and maintain; and which is efficient in operation.

In accordance with one form of harvesting machine embodying this invention, there is provided a power driven frame structure having side sections spaced from each other a distance sufficient to receive between them the bushes of a row. These side sections may be connected at the top by a roof platform, and they both have hollow portions opposite one another substantially midway thereof. In each hollow portion, a vertically moveable carriage is mounted. One carriage carries a shaker mechanism that has a rotatable shaft on which a plurality of vertically spaced ball bearings are eccentrically mounted, the inner rings of these bearings being fixed to the shaft for rotation therewith. On each outer ring of the bearings are a plurality of outwardly extending, radial fingers positioned to engage each bush in succession as the harvesting machine moves forward in a path along a row of bushes in straddling relation therewith. As these fingers penetrate and comb each bush, the branches of the engaged bushes cause the fingers and their respective outer rings to rotate. At the same time, the fingers move in smaller circular paths within the bushes in horizontal planes by reason of the eccentric mountings of the respective bearings. This combined rotation and movement of the aforesaid fingers within the bushes cause the engaged bushes to be shaken to loosen ripe berries therefrom.

In the hollow of the other side section and opposite the aforesaid shaker mechanism, there is mounted a second elevatable carriage holding a fan for blowing the released berries over toward a flexible backboard behind the shaker mechanism. A set of oscillating louvers is also carried by said second carriage for continuously varying the angle at which the air stream set up by the fan is directed toward the bushes. From the lower end of the backboard, there extends an inclined chute onto which the berries fall from the backboard, the chute terminating at an endless conveyor belt which directs the berries thereon toward a collecting point.

BRIEF DESCRIPTION OF THE DRAWING

The novel features of this invention, both as to the structure thereof and its manner of operation, as well as additional objects and advantages thereof, will be understood more readily from the following description, when read in connection with the accompanying drawing, in which:

FIG. 2 is a view as seen from the front, and taken along the line 2-2 of FIG. 1;

FIG. 3 is a detailed enlarged sectional view, along the line 3-3 of FIG. 2, of part of the shaker mechanism of the harvester; and FIG. 4 is a fragmentary sectional view taken along the line 4-4 of FIG. 3.

In the drawing, corresponding parts are referenced throughout by similar numerals.

DESCRIPTION OF A PREFERRED EMBODIMENT

Figure 1:
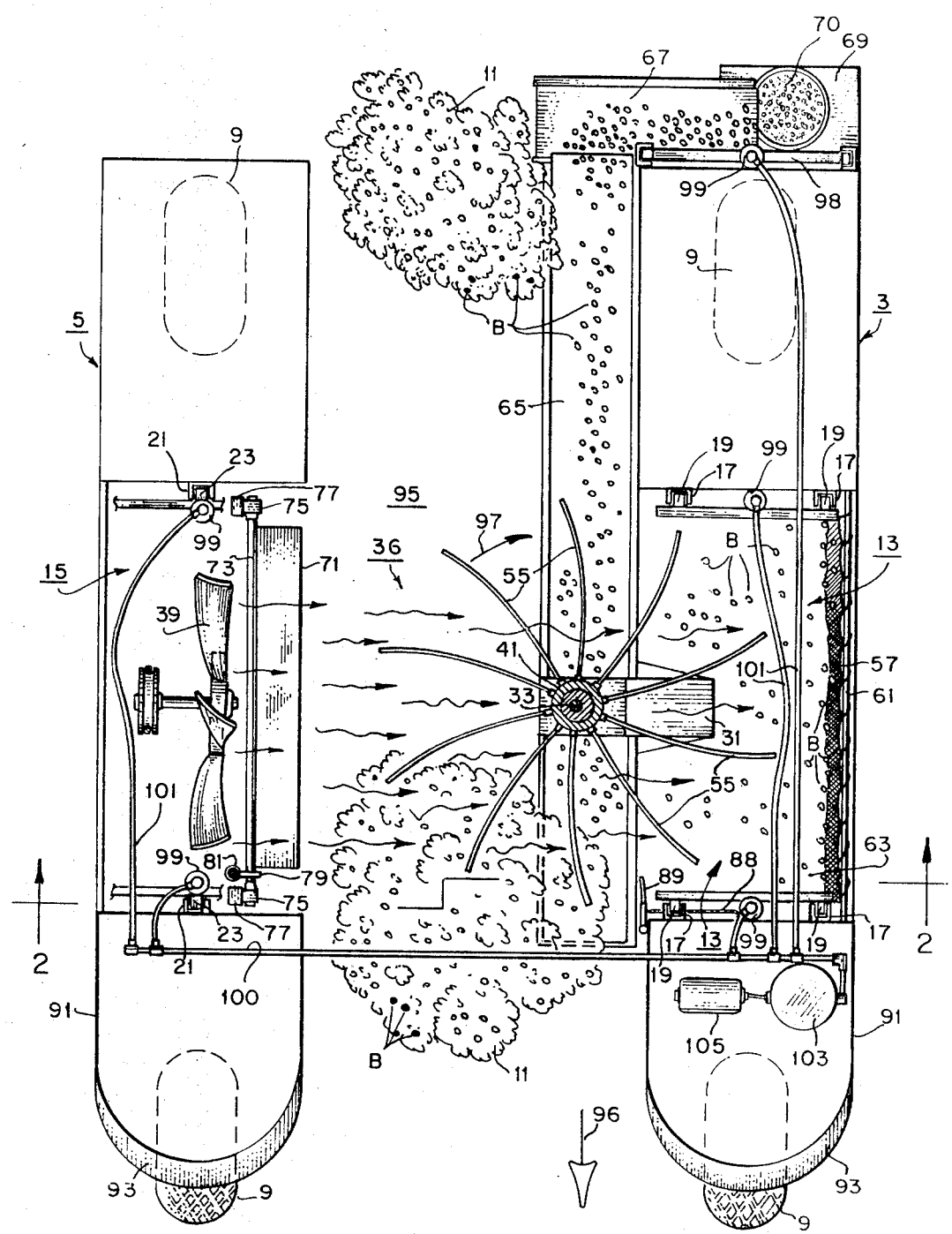
FIG. 1 is a top plan view, partly in section, along the line 1-1 of FIG. 2 and with the top removed, of a berry harvester according to this invention.

Referring more particularly to the drawing, there is shown a berry harvester comprising a frame structure 1 having side sections 3 and 5 and a side-connecting and roof platform 7 thereon (this frame structure is shown in broken lines in FIG. 2 to indicate the general relation of parts). The frame structure 1 is mounted on a set of wheels 9 for engagement with the ground over which the harvester can move past a row of bushes 11 from which berries B are to be picked. The side sections 3 and 5 are spaced a distaNce transversely of the harvester such as to enable the bushes to be received between them, whereby they straddle the bushes as the harvester moves along a row thereof.

The side sections 3 and 5 respectively have hollows 13 and 15 opposite one another generally midway of their lengths. In the hollow 13 is a fixed track structure 17 on which a carriage 19 is slidably mounted for vertical adjustment. Similarly, the hollow 15 has a fixed track structure 21 on which a second carriage 23 is mounted for like vertical adjustment. On the roof platform 7 are mounted an engine coupled to the wheels 9 in well known manner, for propelling the harvester forwardly, the steering gear and operator's seat, and various control and operating mechanisms.

Attached to the carriage 19 are two vertically aligned arms 31 and 32 which project out and extend laterally toward the wide section 5. A vertical rotary shaft 33 is journaled at the lower end on the arm 31 and at the upper end on the arm 32. A motor 34 attached to the carriage 19 (e.g. to arm 32) is coupled to the shaft 33 by means of a drive belt 35. On the shaft 33 is a shaker assembly 36 comprising a plurality of vertically spaced shaker units for shaking each bush in succession to effect removal of berries therefrom. Each such unit has a ball bearing unit 41 (FIG. 3) having an inner race or ring 43, an outer race or ring 45, and a plurality of ball bearings 47 therebetween. The inner ring 43 is mounted on a collar 49 that has an eccentric hole for the shaft 33 and that is fixed to the shaft for rotation therewith, as by a set screw 51 at the lower end thereof. As the shaft 33 is rotated, each of the vertically spaced collars 49 and their respective rings 43 rotate with it. Since the axis 53 of the outer ring 45 is offset with respect to that of the shaft 33, rotation of the latter produces a circular movement of the ring 45 in its horizontal plane. The set screws 51 permit ready adjustment of the shaker unit to various elevations along the shaft 33 depending, for example, on the height of bushes being harvested and the growth of the bushes and their berries.

Secured to each ring 45 (e.g. by welding in holes therein) and extending radially outwardly therefrom are a plurality of circumferentially spaced fingers 55. These fingers extend from their respective rings 45 a distance sufficient to enable them to engage and extend more or less into each bush in succession as the harvester advances. The engagement of the fingers 55 by the bushes causes the fingers and their respective rings 45 to rotate freely on the bearings 47 in the manner of a turnstile. At the same time, the rotating fingers 55, the rings 45 and the bearings 47 are moved by shaft 33 in eccentric circles of small radius corresponding to that of the offset of axis 53. The shaft 33 is rotated by motor 34 at a rate substantially greater than the normal turnstile rotation of fingers 55 produced by travel of the harvester along the bushes. Thereby, during each turnstile rotation of fingers 55, there are several small eccentric rotation of these fingers which are effective as the fingers pass within the bushes to shake the bushes and thus strip the berries therefrom. To enable the fingers 55 to readily penetrate into and subsequently to be withdrawn relatively freely from each bush, the fingers are preferably bent along a curve at their outer extremities as best seen in FIG. 3.

Once the berries B have been stripped, it is necessary to gather or collect them. For this purpose, there is provided a fan 39 mounted by braces 40 on the carriage 23 directly opposite the bush shaker assembly 36 previously described. The fan 39, driven by a motor 37 through a belt drive 38, sets up a substantial air stream through the bush being stripped by the shaker assembly, as illustrated by the wavy arrows in FIG. 2, and blows the stripped berries over against a backboard 57 on the carriage 19 behind the shaker assembly. This backboard is preferably made of a flexible screen or netting of nylon or the like, hung on a rod 61 mounted on the carriage 19, the flexible material being preferred so as to minimize bruising of the berries should they strike the backboard. From there, the berries B fall down onto an inclined chute 63, also on the carriage 19, and leading down from the lower end of the backboard screen 57 to an endless conveyor belt 65 driven by a suitably located motor (not shown). The conveyor belt 65 terminates at a second conveyor belt 67 which carries the berries toward a collecting station platform 69 on which a box or other suitable receptacle may be placed for receiving the harvested berries. A compartmentalized belt conveyor that has been found suitable for conveying the berries from a position close to the ground is described in applicants' copending application Ser. No. 792,354.

Mounted on the carriage 23 in front of the fan 39 is a set of louvers having tiltable slats 71 each fixed to a separate rod 73. The rods 73 are journaled in sockets 75 on vertical bars 77 secured to carriage 23. Each rod 73 has a rearwardly extending arm 79 pivotally connected to a vertical bar 81 which is pivotally connected at its top end to a link 83. This link is coupled eccentrically to a wheel 85 driven by a motor 87. As the motor 87 rotates continuously in one direction, it reciprocates the bar 81 which, in turn, oscillates the slats 71 and tilts them up and down through angles preferably of about 25° to 30° above and back to the horizontal. In this way, the angle at which the air stream set up by the fan 39 is directed to a bush is continuously varied, and the air stream penetrates the bushes and tends to lift the falling berries.

While the shaker assembly described heretofore normally rotates clockwise as shown in FIG. 2, instances may occur when a shaker unit may jam and tend to turn counterclockwise. To prevent such counterclockwise movement, stops 89 are provided on the carriage 19. Each stop is located at the level of a different one of the sets of fingers 55 and comprises a pivoted plate spring 90 (FIG. 3). In its normal position, the plate 90 extends into the path of movement of the ends of the fingers 55 at its level, and it yields by virtue of its spring 88 on engagement thereof by a finger as the latter rotates clockwise. However, the plates 90 have limited movement in the opposite direction, and if any one of them is engaged by a finger rotating in a counterclockwise direction, it will stop rotation of the unit of that finger so that that unit cannot turn backwards.

The frame structure is preferably provided with a sheathing or body of sheet metal 91. At its forward or front end 93, the sheathing 91 is curved on each side whereby, as the harvester moves along between two adjacent rows of bushes, these curved ends will brush opposed bushes aside and clear the way for advancement of the harvester along its preset path. At the same time, the curved ends 93 will direct the bushes to be worked into horizontal alignment one after another for unhampered reception in the space 95 between the side sections 3 and 5. Thus, once the harvester has been set on a course or path along a predetermined row of bushes to be harvested, it can be operated freely and easily by a single operator.

In the operation of the berry harvester, the overall shaker mechanism 36 is adjusted to appropriate vertical position by vertical adjustment of the carriages 19; the fan carriage 23 is similarly adjusted. The conveyor 65 is preferably carried by the carriages 19 and a rear carriage 98 and is adjustable therewith. One form of mechanism suitable for adjusting the carriages 19, 23 and 98 includes hydraulic cylinder units 99 which adjustably support these carriage, and a pump and tank unit 103 driven by a motor 105 and connected by pipes 100 and hoses 101 to the cylinders 99 for powering the cylinders to raise or lower the carriages. Controls (not shown) for these mechanisms are accessible to the operator of the vehicle as he sits on a seat 27 on top of the horizontal platform 7 at the usual steering gear 29 and engine 25. The shaker mechanism 36 is set at a height appropriate to the height of the berry bushes to be harvested, and the fan carriage is similarly and concurrently adjusted for most effectively directing the air stream through the bushes. The shaker unit 41 may be individually adjusted to be uniformly spaced, as shown, or their spacing may be varied for effective engagement of the particular bushes to be harvested. The individual construction of the shaker unit 41 also make it possible to replace the units readily and to repair them.

As the harvester travels forwardly in the direction of the arrow 96, the bushes in their relative backward movement engage the fingers 55 of the shaker mechanism 36 to rotate it in the direction of the arrow 97. The concurrent rotation of shaft 33 produces the aforementioned circular movement of the fingers 55 within the bushes to shake the ripe berries free. Each shaker unit 41 rotates separately from the others and at its own speed depending on its engagement turnstile-wise with its associates section of a berry bush. Thus there is no forced rotation of one set of fingers due to rotation of another set, which avoids any forcing of the shaker fingers through the bushes and thereby avoids breakage of the fragile branches thereof. The circular movement of the fingers produced by the rotating shaft 33 is relatively small in amplitude, and likewise does not endanger the bushes.

The driving of the fan 39 is continuous and produces an air stream of an intensity sufficient to carry the berries a relatively short distance across to the backboard netting 57 and chute 63. The air stream has a lifting component due to the vertical tilting of the louvers 71. Its intensity is sufficiently strong to achieve a gathering action of the berries but generally not sufficient to strip the berries from the bush. In addition, the air stream tends to move the bushes into the fingers to ensure that they are effectively engaged therewith. It has been found that this air stream is highly effective in the gathering of the loose berries, and avoids their being dropped to the ground where they might be bruised or otherwise injured. The fan cooperates effectively with the shaker mechanism to gather the loosened berries, and the single shaker mechanism need only be effective to shake the ripened berries loose from the bush. The clustering of the shaker fingers 55 in the units 41 and their spacing in the individual planes provides ample room for the air stream to pass and to gather the falling berries. The single shaker mechanism with long fingers operating from one side of the bushes is effective to loosen the ripe berries, and the pairing of such shakers on opposite sides of the bushes which is customary in the prior art is preferably dispensed with in view of the airstream berry gathering means. The single shaker offers minimum obstruction to the air stream and its berry gathering action, whereby the air stream is effective to gather the loose berries without the use of pans or other structures under the bushes to catch the falling berries.

The vertical adjustability of the shaker mechanism 36 and the fan 39 makes it possible to harvest low as well as high bushes. In addition, as noted above, the conveyor 65 is connected to the carriages 19 and 98 to be vertically adjustable therewith by means of arms (not shown) that project from the carriages and provide bearings for the conveyor belt drive. In this way the conveyor belt can be adjusted to be a matter of inches from the ground, or higher, as the shaker mechanism is adjusted, so that the gathering of the berries and collection in containers 70 is very efficiently performed. The driver sits atop the bridging roof structure 7 and is in position to steer the vehicle, drive the engine and operate the various motor controls. The roof 7 is preferably an openwork structure so that the driver's view of the berry bushes and harvesting operation is generally unimpeded.

From the foregoing description it will be apparent to those skilled in the art that this invention affords a relatively simple, yet highly efficient, harvester for picking blueberries from bushes with speed and with a minimum of help, and which is adaptable for the harvesting of of other berry types as well. Very few, if any, berries will be lost when this harvester is used. It should be apparent to those skilled in the art that, while only one embodiment of the harvester has been disclosed herein, other forms thereof, as well as modifications of the one described, all coming within the spirit of the present invention, are possible. It is desired, therefore, that the foregoing should be considered merely as illustrative and not in a limiting sense.

What we claim is:

1. A berry harvester for picking berries from bushes arranged in a row, said harvester comprising
   a. a frame structure having opposed, transversely spaced side sections spaced from each other a distance sufficient to permit bushes to be received between them,
   b. a bush shaker mechanism on one of said side sections having bush engaging members located to engage each bush in succession to strip berries therefrom as said harvester advances along each bush,
   c. means on the other of said side sections opposite said shaker mechanism for setting up an air stream directed to each said bush in succession as said harvester advances along each bush for blowing the loosened berries away from the bush, and
   d. means on said one side section for gathering the blown berries.

2. A berry harvester according to claim 1 characterized in that said side sections have a hollow portion intermediate the lengths thereof, each opposite the other, characterized further in that said bush shaker mechanism is located in one of said hollow portions, and characterized further in that said means for setting up said air stream is located in the other of said hollow portions.

3. A berry harvester according to claim 1 wherein the berry gathering means comprises a backboard behind said shaker mechanism against which the loosened berries can be blown, and an inclined chute and belt conveyor means including an endless belt, said chute extending downwardly from the lower end of said backboard and leading down to said belt.

4. A berry harvester according to claim 1 characterized in that said shaker mechanism comprises an assembly having a rotary shaft, a plurality of shaker units on said shaft in spaced relation therealong, each said unit having the inner ring of a bearing mounted eccentrically on said shaft, and characterized still further in that the outer ring of each of said bearings has thereon a plurality of circumferentially spaced, radially outwardly extending fingers for engaging each bush in succession in a row of bushes being harvested, the engagement of said fingers with each of said bushes causing the respective ones of said outer rings to rotate, and the rotation of said shaft and said inner rings causing said outer rings and said fingers to move transversely of said row to thereby help shake the engaged bushes and loosen the berries therefrom.

5. A berry harvester according to claim 4 wherein said shaft extends vertically, said shaker units are adjustably mounted on said shaft for individual adjustment to various elevations, and said shaker mechanism includes means for locking each said shaker unit in a selected position of adjustment, and said fingers are positioned horizontally for rotation about said shaft in horizontal planes at their respective elevations.

6. A berry harvester according to claim 1 characterized in that said air stream producing means comprises a fan carried by said second side section.

7. A berry harvester according to claim 6 characterized by the addition of oscillatable slats between said fan and said shaker mechanism for deflecting said air stream to the respective bushes at a desired angle.

8. A berry harvester according to claim 3 wherein said backboard comprises a netting of flexible material.

9. A berry harvester according to claim 1 wherein said shaker mechanism and air stream means are vertically adjustable on said side sections.

10. A berry harvester having a bush shaker mechanism for engaging berry bushes and for removing berries therefrom, said shaker mechanism comprising an assembly having a rotary vertical shaft, a plurality of shaker units on said shaft in spaced relation therealong, each of said units having the inner ring of a bearing mounted eccentrically on said shaft, the outer ring of each of said bearings having thereon a plurality of circumferentially spaced, radially outwardly extending fingers for engaging each bush in succession in a row being harvested, the engagement of said fingers with each of said bushes causing the respective ones of said outer rings to rotate, and the rotation of said shaft and said inner rings causing said outer rings and said fingers to move transversely of said row to thereby help shake the engaged bushes and loosen the berries therefrom.